United States Patent
Li

(10) Patent No.: US 11,487,697 B2
(45) Date of Patent: Nov. 1, 2022

(54) HDMI-FREE DISPLAY DEVICE AND METHOD FOR TYPE INTERFACE BEING COMPATIBLE WITH HDMI

(71) Applicant: SHENZHEN PARAMOUNT TECH CO., LTD, Guangdong (CN)

(72) Inventor: Jie Li, Guangdong (CN)

(73) Assignee: SHENZHEN PARAMOUN T TECH CO., LTD, Shenzhen (CN)

(*) Notice: Subject to any disclaimer, the term of this patent is extended or adjusted under 35 U.S.C. 154(b) by 0 days.

(21) Appl. No.: 17/547,213

(22) Filed: Dec. 9, 2021

(65) Prior Publication Data

US 2022/0229801 A1 Jul. 21, 2022

Related U.S. Application Data

(63) Continuation of application No. PCT/CN2021/122313, filed on Sep. 30, 2021.

(30) Foreign Application Priority Data

Jan. 18, 2021 (CN) .......................... 202110066210.0

(51) Int. Cl.
*G06F 13/42* (2006.01)
*G06F 13/38* (2006.01)

(52) U.S. Cl.
CPC ........ *G06F 13/4282* (2013.01); *G06F 13/382* (2013.01); *G06F 2213/0042* (2013.01)

(58) Field of Classification Search
CPC .................................................. G06F 13/4282
See application file for complete search history.

(56) References Cited

U.S. PATENT DOCUMENTS

2017/0161227 A1* 6/2017 Lai ...................... G06F 13/4081
2020/0226087 A1* 7/2020 Sun ..................... G06F 13/4081

* cited by examiner

*Primary Examiner* — Henry Tsai
*Assistant Examiner* — Juanito C Borromeo

(57) ABSTRACT

Disclosed is a HDMI-free display device, which includes a TypeC interface, a TypeC protocol chip, a switching chip, a DP switch and a monitor main control chip with a DP receiving end and a HDMI receiving end; the TypeC interface is connected to the DP receiving end and the HDMI receiving end of the monitor main control chip via the switching chip and the DP switch; a CC pin of the TypeC interface is connected with the TypeC protocol chip and configured for the TypeC protocol chip to determine whether a transmission signal is a HDMI signal or a TypeC signal and to determine whether the transmission signal is in a positive or negative plug-in state; the TypeC protocol chip is further configured to control the switching chip to transfer the transmission signal to be in a positive plug-in state.

5 Claims, 2 Drawing Sheets

S1, In an initial state, a TypeC protocol chip is communicated with a TypeC interface through a selecting switch, the TypeC protocol chip is communicated with an inserting device through a CC pin of the TypeC interface and determines whether an input signal is a HDMI signal or a TypeC signal and also determines a forward and a backward insertion states of the transmission signal; and when the communication succeeds, the input signal is the TypeC signal, and if the communication is successful, the input signal is the HDMI signal, and at the same time, the TypeC protocol chip determines the forward and the backward insertion states of the input signal according to a grounding state of the CC pin

S2, When the TypeC protocol chip determines that the input signal is the TypeC signal and the TypeC signal is in the forward insertion state, the switching chip does not switch the forward and the backward states of the TypeC signal; when the TypeC protocol chip determines that the input signal is the TypeC signal and the TypeC signal is in the backward insertion state, the TypeC protocol chip controls the switching chip to switch the TypeC signal to be in the forward insertion state; when the TypeC protocol chip determines that the input signal is the HDMI signal and the HDMI signal is in the forward insertion state, the switching chip does not switch the forward and the backward states of the HDMI signal; and when the TypeC protocol chip determines that the input signal is the HDMI signal and the HDMI signal is in the backward insertion state, the TypeC protocol chip controls the switching chip to switch the HDMI signal to be in the forward insertion state

S3, When the input signal is the TypeC signal, the TypeC protocol chip controls a DP switch to connect the TypeC signal in the forward insertion state to a DP receiving end of a monitor main control chip; and when the input signal is the HDMI signal, the TypeC protocol chip controls the DP switch to connect the HDMI signal in the forward insertion state to a HDMI receiving end of the monitor main control chip

S31, When the input signal is the HDMI signal, after the step S3 is executed, the TypeC protocol chip performs negative control on the selecting switch, so that the CC pin of the TypeC interface is communicated with a hot-swapping detecting end of the monitor main control chip

S4, The monitor main control chip processes the received TypeC signal or HDMI signal and outputs the signal to a processor

FIG. 2

HDMI-FREE DISPLAY DEVICE AND METHOD FOR TYPE INTERFACE BEING COMPATIBLE WITH HDMI

CROSS-REFERENCE TO RELATED APPLICATION

The present application is a continuation of international application of PCT application No. PCT/CN2021/122313 filed on Sep. 30, 2021, which claims the priority benefit of China application No. 202110066210.0 filed on Jan. 18, 2021. The entirety of the above-mentioned patent applications is incorporated herein by reference and made a part of this specification.

TECHNICAL FIELD

The present application relates to the technical field of display devices, and in particular to a HDMI (High-Definition Multimedia Interface)-free display device and a method for a Type interface being compatible with a HDMI.

BACKGROUND ART

With the increasing number of TypeC (USB Type-C) signal devices, portable display devices are becoming more and more popular. Because a TypeC interface is small in size and can supply power and output signals simultaneously, the portable display devices all use the TypeC interface.

However, the existing display devices are also provided with HDMIs, so that the display devices are large in size and inconvenient to carry.

SUMMARY

Aiming at the defects and disadvantages of the prior art, the present application provides a HDMI-free display device, which has the advantages that a TypeC interface can be compatible with HDMI signals, and is small in size and convenient to carry. To realize the purpose, a technical solution adopted by the present application is as follows. A HDMI-free display device includes a TypeC interface, a TypeC protocol chip, a switching chip, a DP (Display Port) switch and a monitor main control chip with a DP receiving end and a HDMI receiving end; wherein, the TypeC interface is connected to the DP receiving end and the HDMI receiving end of the monitor main control chip via the switching chip and the DP switch; a CC pin of the TypeC interface is connected with the TypeC protocol chip and configured for the TypeC protocol chip to determine whether a transmission signal is a HDMI signal or a TypeC signal and to determine whether the transmission signal is in a positive or negative plug-in state; the TypeC protocol chip is further configured to control the switching chip to transfer the transmission signal to be in a positive plug-in state; the TypeC protocol chip is further configured to control the DP switch to connect a TypeC signal in a positive plug-in state to the DP receiving end and connect a HDMI signal in a positive plug-in state to the HDMI receiving end.

Further, in the present application, the HDMI-free display device further includes a selecting switch; wherein the CC pin of the TypeC interface is respectively connected with the TypeC protocol chip and a hot plug-in detecting end of the monitor main control chip via the selecting switch; the TypeC interface multiplexes a TypeC protocol signal and a hot plug-in signal to the CC pin via the selecting switch; and in an initial state, the selecting switch is communicated with the TypeC protocol chip.

Further, in the present application, the model of the monitor main control chip is RTD2795UT. Further, the model of the switching chip is TI460.

By adopting the above technical solution, the present application has the beneficial effects that the TypeC interface can be compatible with a HDMI input source, so that the display device does not need the HDMI, can be made in a smaller size, and is more convenient to carry.

A method for method for a Type interface being compatible with a HDMI includes the following steps:

Step 1, in an initial state, a TypeC protocol chip is communicated with the TypeC interface via a selecting switch, the TypeC protocol chip is communicated with a plug-in device via a CC pin of the TypeC interface for determining whether an input signal is a HDMI signal or a TypeC signal and determining whether a transmission signal is in a positive or negative plug-in state; if the communication is successful, determining that the input signal is a TypeC signal, and if the communication is unsuccessful, determining that the input signal is a HDMI signal; and at the same time, determining, by the TypeC interface, whether the transmission signal is in a positive or negative plug-in state according to a grounding state of the CC pin;

Step 2, when the TypeC protocol chip determines that the input signal is a TypeC signal and the TypeC signal is in a positive plug-in state, the switching chip does not switch the plug-in state of the TypeC signal; when the TypeC protocol chip determines that the input signal is a TypeC signal and the TypeC signal is in a negative plug-in state, controlling, by the TypeC protocol chip, the switching chip to switch the TypeC signal to be in a positive plug-in state; when the TypeC protocol chip determines that the input signal is a HDMI signal and the HDMI signal is in a positive plug-in state, the switching chip does not switch the plug-in state of the HDMI signal; when the TypeC protocol chip determines that the input signal is a HDMI signal and the HDMI signal is in a negative plug-in state, controlling, by the TypeC protocol chip, the switching chip to switch the HDMI signal to be in a positive plug-in state;

Step 3, when the input signal is a TypeC signal, controlling, by the TypeC protocol chip, a DP switch to connect the TypeC signal in a positive plug-in state to a DP receiving end of a monitor main control chip; and when the input signal is a HDMI signal, controlling, by the TypeC protocol chip, the DP switch to connect the HDMI signal in a positive plug-in state to a HDMI receiving end of the monitor main control chip;

Step 31, when the input signal is a HDMI signal, after the Step 3 is executed, controlling, by the TypeC protocol chip, a selecting switch so that a CC pin of the TypeC interface is communicated with a hot plug-in detecting end of the monitor main control chip;

Step 4, processing, by the monitor main control chip, the received TypeC signal or HDMI signal and outputting to a processor.

By adopting the above technical solution, the present application has the beneficial effects that the TypeC interface can be compatible with a HDMI input source, and either the input TypeC signal or HDMI signal can be used, so that the display device does not need the HDMI, can be made in a smaller size, and is more convenient to carry.

BRIEF DESCRIPTION OF THE DRAWINGS

To more clearly describe the technical solutions in the embodiments of the present application or in the prior art, the drawings required to be used in the description of the embodiments or in the prior art are simply presented below. Apparently, the following drawings show some embodiments of the present application, so for those ordinary skilled in the art, other drawings can also be obtained according to these drawings without contributing creative labor.

FIG. 2 is a flow chart of the present application.

DETAILED DESCRIPTION

Figure 1:
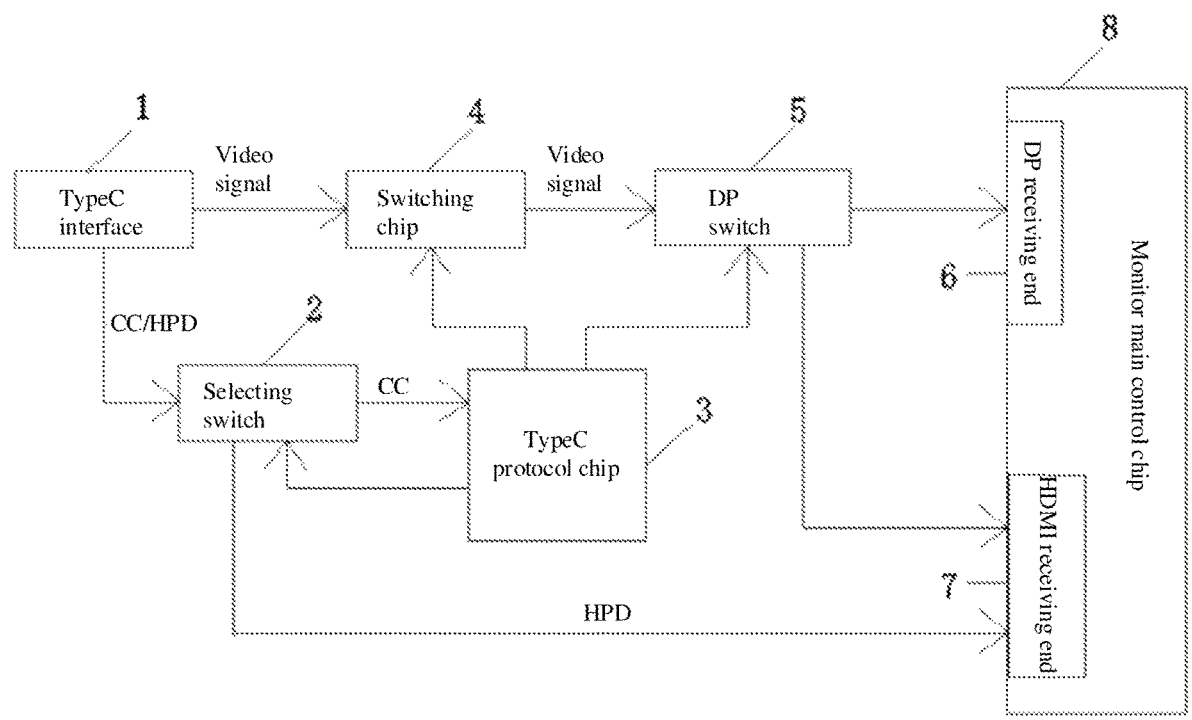
FIG. 1 is a block diagram of the present application.

The present application is further described in detail below in combination with the accompanying drawings.

The specific embodiment is merely to explain rather than limiting the present application. After reading the description of the present application, the technical skilled in the art can modify the embodiment without creative contribution as required, but the modification is protected by the patent law as long as the modification is within the scope of the claims of the present application.

The present embodiment relates to a HDMI-free display device, as shown in FIG. 1. The HDMI-free display device includes a TypeC interface 1, a TypeC protocol chip 3, a switching chip 4, a DP switch 5 and a monitor main control chip 8 with a DP receiving end 6 and a HDMI receiving end 7.

In the application, because there is a problem with a positive and negative plug-in of a plug-in device plugged into the TypeC interface 1, the switching is needed. A CC pin is a pair of differential signal wires in the TypeC interface 1, which is used for communicating with the TypeC protocol chip 3. HPD is a hot plug-in detecting end of the monitor main control chip 8, which is provided with only one pin. The monitor main control chip 8 controls the pin to inform a HDMI plug-in device whether a display terminal is connected. When a HDMI plug-in device needs to be used, an external wire with a HDMI end and a TypeC end is needed, wherein HDMI is an input end, and TypeC is an output end.

Specifically, the TypeC interface 1 is connected to the DP receiving end 6 and the HDMI receiving end 7 of the monitor main control chip 8 via the switching chip 4 and the DP switch 5. The CC pin of the TypeC interface 1 is connected with the TypeC protocol chip 3 and configured for the TypeC protocol chip 3 to determine whether a transmission signal is a HDMI signal or a TypeC signal and to determine whether a transmission signal is in a positive or negative plug-in state. The TypeC protocol chip 3 is also configured to control the switching chip 4 to switch the transmission signal to be in a positive plug-in state. The TypeC protocol chip 3 is also configured to control the DP switch 5 to connect the TypeC signal in a positive plug-in state to the DP receiving end 6 and connect the HDMI signal in a positive plug-in state to the HDMI receiving end 7.

The TypeC protocol chip 3 is communicated with a plug-in device via the CC pin of the TypeC interface 1. When the communication is successful, it is determined that the input signal is a TypeC signal; and when the communication is not successful, it is determined that the input signal is a HDMI signal. At the same time, the TypeC protocol chip 3 determines a positive and negative plug-in state of the input signal according to a grounding state of the CC pin. The TypeC interface 1 can be compatible with a HDMI signal source, so that the display device does not need a HDMI, thus the device can be made in a smaller size, and is more convenient to carry.

Specifically, the model of the monitor main control chip 8 is RTD2795UT. RTD2795UT is provided with two DP receiving ends 6 and two HDMI receiving ends 7. The TypeC signal is inputted and connected to the DP receiving ends 6 (a video signal transmitted by the TypeC is in a DP format), and the HDMI signal is connected to the HDMI receiving ends 7.

Specifically, in the present embodiment, the model of the switching chip 4 is TI460. TI460 can exchange the positive and negative input signals and then output the signals.

In other embodiments, one or more TypeC interfaces 1 may be provided.

The present application also provides a method for method for a Type interface being compatible with a HDMI, which includes the following steps, as shown in FIG. 2:

Step 1, in an initial state, a TypeC protocol chip 3 is communicated with the TypeC interface 1 via a selecting switch, the TypeC protocol chip 3 is communicated with a plug-in device via a CC pin of the TypeC interface 1 for determining whether an input signal is a HDMI signal or a TypeC signal and determining whether a transmission signal is in a positive or negative plug-in state; if the communication is successful, determining that the input signal is a TypeC signal, and if the communication is unsuccessful, determining that the input signal is a HDMI signal; and at the same time, determining, by the TypeC interface 3, whether the transmission signal is in a positive or negative plug-in state according to a grounding state of the CC pin;

Step 2, when the TypeC protocol chip 3 determines that the input signal is a TypeC signal and the TypeC signal is in a positive plug-in state, the switching chip 4 does not switch the plug-in state of the TypeC signal; when the TypeC protocol chip 3 determines that the input signal is a TypeC signal and the TypeC signal is in a negative plug-in state, controlling, by the TypeC protocol chip 3, the switching chip 4 to switch the TypeC signal to be in a positive plug-in state; when the TypeC protocol chip 3 determines that the input signal is a HDMI signal and the HDMI signal is in a positive plug-in state, the switching chip 4 does not switch the plug-in state of the HDMI signal; when the TypeC protocol chip 3 determines that the input signal is a HDMI signal and the HDMI signal is in a negative plug-in state, controlling, by the TypeC protocol chip 3, the switching chip 4 to switch the HDMI signal to be in a positive plug-in state;

Step 3, when the input signal is a TypeC signal, controlling, by the TypeC protocol chip 3, a DP switch 5 to connect the TypeC signal in a positive plug-in state to a DP receiving end 6 of a monitor main control chip 8; and when the input signal is a HDMI signal, controlling, by the TypeC protocol chip 3, the DP switch 5 to connect the HDMI signal in a positive plug-in state to a HDMI receiving end 7 of the monitor main control chip 8;

Step 31, when the input signal is a HDMI signal, after the step S3 is executed, controlling, by the TypeC protocol chip 3, a selecting switch 2 so that a CC pin of the TypeC interface 1 is communicated with a hot plug-in detecting end of the monitor main control chip 8;

Step 4, processing, by the monitor main control chip 8, the received TypeC signal or HDMI signal and outputting to a processor.

By adopting the method, the TypeC interface can be compatible with a HDMI input source, and either the input TypeC interface or HDMI signal can be used; and moreover, the display device using the method does not need a HDMI, can be made in a smaller size, and is more convenient to carry.

The above is only used to illustrate the technical solution of the present application, but not to limit the present application. Other modifications or equivalent substitutions made by those ordinary skilled in the art should be included in the claim scope of the present application without deviating from the spirit and scope of the technical solution of the present application.

List of References: 1, TypeC interface; 2, selecting switch; 3, TypeC protocol chip; 4, switching chip; 5, DP switch; 6, DP receiving end; 7, HDMI receiving end; 8, monitor main control chip.

What is claimed is:

1. A high-definition multimedia interface (HDMI)-free display device, comprising: a USB type-C (TypeC) interface, a TypeC protocol chip, a switching chip, a display port (DP) switch and a monitor main control chip with a DP receiving end and a HDMI receiving end; wherein,
the TypeC interface is connected to the DP receiving end and the HDMI receiving end of the monitor main control chip via the switching chip and the DP switch;
a CC pin of the TypeC interface is connected with the TypeC protocol chip and configured for the TypeC protocol chip to determine whether a transmission signal is a HDMI signal or a TypeC signal and to determine whether the transmission signal is in a positive or negative plug-in state;
the TypeC protocol chip is further configured to control the switching chip to transfer the transmission signal to be in a positive plug-in state;
the TypeC protocol chip is further configured to control the DP switch to connect a TypeC signal in a positive plug-in state to the DP receiving end and connect a HDMI signal in a positive plug-in state to the HDMI receiving end;
wherein the HDMI-free display device further comprises a selecting switch; wherein the CC pin of the TypeC interface is respectively connected with the TypeC protocol chip and a hot plug-in detecting end of the monitor main control chip via the selecting switch; the TypeC interface multiplexes a TypeC protocol signal and a hot plug-in signal to the CC pin via the selecting switch; and in an initial state, the selecting switch is communicated with the TypeC protocol chip.

2. The HDMI-free display device according to claim 1, wherein a model of the monitor main control chip is RTD2795UT.

3. The HDMI-free display device according to claim 1, wherein a model of the switching chip is TI460.

4. A method for a Type interface being compatible with a HDMI, comprising:

Step 1, in an initial state, a TypeC protocol chip is communicated with the TypeC interface via a selecting switch, the TypeC protocol chip is communicated with a plug-in device via a CC pin of the TypeC interface for determining whether an input signal is a HDMI signal or a TypeC signal and determining whether a transmission signal is in a positive or negative plug-in state; if the communication is successful, determining that the input signal is a TypeC signal, and if the communication is unsuccessful, determining that the input signal is a HDMI signal; and at the same time, determining, by the TypeC interface, whether the transmission signal is in a positive or negative plug-in state according to a grounding state of the CC pin;

Step 2, when the TypeC protocol chip determines that the input signal is a TypeC signal and the TypeC signal is in a positive plug-in state, the switching chip does not switch the plug-in state of the TypeC signal;

when the TypeC protocol chip determines that the input signal is a TypeC signal and the TypeC signal is in a negative plug-in state, controlling, by the TypeC protocol chip, the switching chip to switch the TypeC signal to be in a positive plug-in state;

when the TypeC protocol chip determines that the input signal is a HDMI signal and the HDMI signal is in a positive plug-in state, the switching chip does not switch the plug-in state of the HDMI signal;

when the TypeC protocol chip determines that the input signal is a HDMI signal and the HDMI signal is in a negative plug-in state, controlling, by the TypeC protocol chip, the switching chip to switch the HDMI signal to be in a positive plug-in state;

Step 3, when the input signal is a TypeC signal, controlling, by the TypeC protocol chip, a DP switch to connect the TypeC signal in a positive plug-in state to a DP receiving end of a monitor main control chip; and when the input signal is a HDMI signal, controlling, by the TypeC protocol chip, the DP switch to connect the HDMI signal in a positive plug-in state to a HDMI receiving end of the monitor main control chip;

Step 4, processing, by the monitor main control chip, the received TypeC signal or HDMI signal and outputting to a processor.

5. The method for a Type interface being compatible with a HDMI according to claim 4, further comprising:

Step 31, when the input signal is a HDMI signal, after the Step 3 is executed, controlling, by the TypeC protocol chip, a selecting switch so that a CC pin of the TypeC interface is communicated with a hot plug-in detecting end of the monitor main control chip.

\* \* \* \* \*